United States Patent
Batshon et al.

(10) Patent No.: US 9,407,398 B2
(45) Date of Patent: Aug. 2, 2016

(54) SYSTEM AND METHOD USING CASCADED SINGLE PARTITY CHECK CODING

(71) Applicant: Tyco Electronics Subsea Communications LLC, Eatontown, NJ (US)

(72) Inventors: Hussam G. Batshon, Eatontown, NJ (US); Hongbin Zhang, Marlboro, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 157 days.

(21) Appl. No.: 14/020,861

(22) Filed: Sep. 8, 2013

(65) Prior Publication Data

US 2015/0071312 A1    Mar. 12, 2015

(51) Int. Cl.
  *H04J 3/02* (2006.01)
  *H04L 1/00* (2006.01)
  *H04B 10/2575* (2013.01)
  *H04J 14/02* (2006.01)

(52) U.S. Cl.
  CPC .......... *H04L 1/0056* (2013.01); *H04B 10/2575* (2013.01); *H04J 14/02* (2013.01); *H04L 1/0058* (2013.01); *H04L 1/0063* (2013.01)

(58) Field of Classification Search
  None
  See application file for complete search history.

(56) References Cited

U.S. PATENT DOCUMENTS

| | | | |
|---|---|---|---|
| 6,034,996 A | 3/2000 | Herzberg | |
| 6,195,396 B1 | 2/2001 | Fang et al. | |
| 6,259,743 B1 | 7/2001 | Garth | |
| 6,473,878 B1 | 10/2002 | Wei | |
| 6,622,277 B1 | 9/2003 | Ramanujam et al. | |
| 6,904,087 B2 | 6/2005 | Li | |
| 6,944,235 B2 | 9/2005 | Ophir | |
| 7,116,724 B2 | 10/2006 | You | |
| 7,613,253 B2 | 11/2009 | Weinholt | |
| 7,778,341 B2 | 8/2010 | Tong et al. | |
| 8,234,538 B2 | 7/2012 | Djordjevic et al. | |
| 8,255,763 B1 | 8/2012 | Yang et al. | |
| 8,295,713 B2 | 10/2012 | Cai | |
| 8,301,967 B2 | 10/2012 | Bhaskaran et al. | |
| 8,775,892 B2 | 7/2014 | Zhang et al. | |
| 8,924,823 B2 | 12/2014 | Zhang et al. | |
| 2002/0166091 A1 | 11/2002 | Kidorf et al. | |
| 2004/0010747 A1 | 1/2004 | Hewitt et al. | |
| 2005/0166132 A1 | 7/2005 | Shen et al. | |
| 2005/0278607 A1 | 12/2005 | Garodnick | |
| 2006/0031737 A1 | 2/2006 | Chugg et al. | |

(Continued)

FOREIGN PATENT DOCUMENTS

EP   1835625   9/2007

OTHER PUBLICATIONS

Office Action issued on Sep. 25, 2014 in the United States in connection with U.S. Appl. No. 13/569,628.

(Continued)

*Primary Examiner* — Minh-Trang Nguyen

(57) ABSTRACT

A system and method including a parity bit encoder for encoding each n−3 bits of data to be transmitted with three parity check bits to produce blocks of n bits (n−3 information bits plus three parity bits associated with the n information bits). Each of the blocks of n bits are Gray mapped to three QAM symbols that are modulated onto an optical wavelength and transmitted to a receiver. A maximum a posteriori (MAP) decoder is used at the receiver to correct for cycle slip.

20 Claims, 10 Drawing Sheets

(56) References Cited

U.S. PATENT DOCUMENTS

| | | | |
|---|---|---|---|
| 2007/0118787 | A1 | 5/2007 | Schmidt |
| 2008/0273614 | A1 | 11/2008 | Heegard |
| 2009/0150746 | A1 | 6/2009 | Chaichanavong et al. |
| 2010/0040163 | A1* | 2/2010 | Caire et al. ............. 375/261 |
| 2010/0146363 | A1 | 6/2010 | Birru et al. |
| 2010/0169738 | A1 | 7/2010 | Wu et al. |
| 2011/0150503 | A1 | 6/2011 | Winzer |
| 2012/0072802 | A1 | 3/2012 | Chinnici et al. |
| 2012/0079341 | A1 | 3/2012 | Wajcer et al. |
| 2012/0082459 | A1 | 4/2012 | Wu et al. |
| 2012/0189303 | A1 | 7/2012 | Winzer et al. |
| 2012/0242518 | A1 | 9/2012 | Martin |
| 2012/0269512 | A1 | 10/2012 | Koley et al. |
| 2013/0002962 | A1 | 1/2013 | Limberg |
| 2013/0215996 | A1 | 8/2013 | Boutros et al. |
| 2013/0216221 | A1 | 8/2013 | Zhang et al. |
| 2014/0068385 | A1 | 3/2014 | Zhang et al. |
| 2014/0153672 | A1* | 6/2014 | Zhao et al. ............. 375/320 |
| 2014/0281832 | A1 | 9/2014 | Zhang et al. |

OTHER PUBLICATIONS

Norifumi Kamiya et al; "Concatenated QC-LDPC and SPC codes for 100 Gbps ultra long-haul optical transmission systems"; Optical Fiber Communication (OFC), Collocated National Fiber Optic Engineers Conference, 2010 Conference on (OFC/NFOEC), IEEE, Piscataway, NJ USA, Mar. 21, 2010.

Jin-Xing Cai; "100G Transmission Over Transoceanic Distance with High Spectral Efficiency and Large Capacity"; Journal of Lightwave Technology, IEEE Service Center, New York, NY, US, vol. 30, No. 24, Dec. 2012 (Feb. 2012), pp. 3845-3856.

International Search Report issued in application No. PCT/US13/054819, completed on Apr. 11, 2014.

International Search Report issued in application No. PCT/US14/022401 on Jun. 23, 2014.

US Office Action mailed Dec. 19, 2013 in connection with Application U.S. Appl. No. 13/569,628.

Zhang, Hongbin et al.; "16QAM Transmission with 5.2 Bits/s/Hz Spectral Efficiency Over Transoceanic Distance"; Optics Express, 2012, pp. 11688-11693, vol. 20, Issue 11.

Jianzhong Guo et al; "Performance Analysis of PA Coded Pulse-Position Modulation for Space Optical Communications"; Information Engineering and Computer Science (ICIECS), 2010 2nd International Conference on IEEE, Piscataway, NJ, USA, Dec. 25, 2010, pp. 1-3, XP031842377, ISBN: 978-1-4244-7939-9.

Cai Y et al; "On the Bit-Error Rate of Product Accumulate Codes in Optical Fiber Communications"; Journal of Lightwave Technology, IEEE Service Center, New York, NY, US, vol. 22, No. 2, Feb. 1, 2004, pp. 640-646, XP011109885, ISSN: 0733-8724, DOI: 10.1109/JLT.2003.821766.

Siegel P H et al; Serial Concatenated TCM With an Inner Accumulate Code-Part II: Density-Evolution Analysis; IEEE Transactions on Communications; IEEE Service Center, Piscataway, NJ, USA, vol. 53, No. 2, Feb. 1, 2005, pp. 252-262, XP011127707, ISSN: 0090-6778, DOI: 10.1109/TCOMM.2004.841986.

Chung-Li Wang et al; "Low-Density Parity-Check Accumulate Codes"; Information Theory and Its Applications (Isita), 2010 International Symposium on, IEEE, Piscataway, NJ, USA, Oct. 17, 2010, pp. 7-12, XP031811755, ISBN: 978-1-4244-6016-8.

International Search Report issued in PCT Patent Application No. PCT/US2013/024014 dated Apr. 12, 2013.

Zhang et al; "Single Parity Check Bit Interleaved Coded Modulation with Iterative Decoding"; 8 pages.

Zhang et al; "Square Modulus Algorithm for Blind Equalization and Carrier Phase Recovery in a 16-QAM Optical Coherent System"; 6 pages.

Alex Alvarado; "On Bit-Interleaved Coded Modulation with QAM Constellations"; Chalmers; Department of Signals and Systems; Communication Systems Group, Chalmers University of Technology; Goteborg, Sweden, May 2008, 52 pages.

Charan Langton, Editor; Signal Processing & Simulation Newsletters; Jul. 1999; 27 pages; http://www.complextoreal.com/convo.htm printed Feb. 9, 2012.

Chip Fleming; "A Tutorial on Convolutional Coding with Viterbi Decoding"; Spectrum Applications; Updated Jun. 21, 2011; printed at http://pw1.netcom.com/~chip.f/viterbi/tutorial.html on Feb. 9, 2012; 5 pages.

"Gray Code", Wikipedia; printed Feb. 13, 2012; 16 pages.

"Convolutional Code"; Wikipedia; printed Feb. 9, 2012; 7 pages.

Krishna Sankar; "Binary to Gray Code for 16QAM"; Jun. 1, 2008; printed at http://www.dsplog.com/2008/06/01/binary-to-gray-code-for-16qam/ on Feb. 13, 2012.

Batshon Hussam G et al: "Multidimensional SPC-based bit-interleaved coded-modulation for spectrally-efficient optical transmission systems", Proceedings of the SPIE; [Intelligent Vehicle Highway Systems], S P I E—International Society for Optical Engineering, US, vol. 9008, Dec. 20, 2013, pp. 90080F-90080F.

Martin P A et al: "Mulitple serial and parallel concatenated single parity-check codes", IEEE Transactions on Communications, IEEE Service Center, Piscataway, NJ. USA, vol. 51, No. 10, Oct. 1, 2003, pp. 1666-1675.

Chouly et al: Six-Dimensional Trellis-Coding With QAM Signal Sets:, IEEE Transactions on Communications, IEEE Service Center, Piscataway, NJ, USA, vol. 40, No. 1, Jan. 1, 1992, pp. 24-33.

International Search Report issued in corresponding PCT application No. PCT/US2014/053116, mailed on Nov. 7, 2014.

International Search Report, International Application No. PCT/US2014/068257, International Filing Date Dec. 3, 2014.

Gho et al., "Rate-Adaptive Modulation and Coding for Optical Fiber Transmission Systems", Journal of Lightwave Technology, IEEE Service Center, New York, NY US, vol. 30, No. 12, Jun. 1, 2012, pp. 1818-1828.

Rios-Muller et a., Experimental Comparison between Hybrid-QPSK/8QAM and 4D-32SP-16QAM Formats at 31.2 GBaud using Nyquist Pulse Shaping, Optical Communication (ECOC 2013) 39th European Conference and Exhibition on IET 2013, 3 pages.

Zhou et al., "12,000 km Transmission of 100GHz Spaced, 8x495-Gb/s PDM Time-Domain Hybrid QPSK-8QAM Signals," Optical Fiber Communications Conference. Optical Society of America, 2013, 3 pages.

Fischer et al., Bandwidth-Variable Transceivers Based on 4D Modulation Formats for Future Flexible Networks, Optical Communication (ECOC 2013), 39th European Conference and Exhibition on IET, 2013, 3 pages.

Renaudier et al., Experimental Transmission of Nyquist Pulse Shaped 4-D Coded Modulation using Dual Polarization 16QAM Set-Partitioning Schemes at 28 Gbaud Optical Communication (ECOC 2013), 39th European Conference and Exhibition on IET, 2013, 3 pages.

Cai "100G Transmission Over Transoceanic Distance with High Spectral Efficiency and Large Capacity," Journal of Lightwave Technology, IEEE Service Center, New York, NY, US, (2012) 30(24):3845-3856.

Xue et al., A Variable Step Size Blind Equalization Algorithm for QAM Signals, ICMMT 2010 Proceedings 978-1-4244-5708-3, pp. 1801-1803.

Mohammad "Coding and and Modulation for Spectral Efficient Transmission," Institut fur Nachrichlenubertragung der Universitat Stuttgart (2010) 156 pages.

\* cited by examiner

SYSTEM AND METHOD USING CASCADED SINGLE PARTITY CHECK CODING

TECHNICAL FIELD

The present disclosure relates to optical signal data detection and more particularly, to a system and method using cascaded single parity check coding.

BACKGROUND

In wavelength division multiplexed (WDM) optical communication systems, a number of different optical carrier wavelengths are separately modulated with data to produce modulated optical signals. The modulated optical signals are combined into an aggregate signal and transmitted over an optical transmission path to a receiver. The receiver detects and demodulates the data.

One type of modulation that may be used in optical communication systems is phase shift keying (PSK). According to different variations of PSK, data is transmitted by modulating the phase of an optical wavelength such that the phase or phase transition of the optical wavelength represents symbols encoding one or more bits. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol. Other phase shift keying formats include differential phase shift keying (DPSK) formats and variations of PSK and DPSK formats, such as return-to-zero DPSK (RZ-DPSK) and polarization division multiplexed QPSK (PDM-QPSK).

A modulation format, such as QPSK wherein multiple information bits are to be encoded on a single transmitted symbol may be generally referred to as a multi-level modulation format. Multi-level modulation techniques have been used, for example, to allow increased transmission rates and decreased channel spacing, thereby increasing the spectral efficiency (SE) of each channel in a WDM system. One spectrally efficient multi-level modulation format is quadrature amplitude modulation (QAM). In a QAM signal, information is modulated using a combination of phase shift keying and amplitude shift keying, for example, to encode multiple bits per symbol. An $M^2$-QAM signal may be used to encode M bits per symbol. For example, a 16-QAM modulation format may be used to encode 4 bits per symbol. PSK modulation schemes (e.g., BPSK and QPSK) may be referred to as a level of QAM (e.g., 2 QAM and 4 QAM respectively).

Higher order QAM schemes are useful in realizing flexi-rate transponder technology wherein multiple data rates may be achieved over the same bandwidth (or symbol rate) using different SE. Multiple SEs can be realized using QAM by varying the amount of redundancy in the design, e.g. higher redundancy leads to a lower SE. The redundancy can come from altering the overhead (OH) of the forward error correction code (FEC) used in the scheme, or by introducing a simple extra layer of coding that is mainly used for coded modulation purposes. Coded modulation is particularly useful when the symbol rate, constellation grid and FEC overhead are fixed.

In phase modulated optical communication systems using, for example, a QAM scheme, the receiver may be a coherent receiver using coherent detection, e.g. homodyne or heterodyne detection, to detect modulated optical signals. The term "coherent" when used herein in relation to a receiver refers to a receiver including a local oscillator (LO) for demodulating the received signal. Digital signal processing (DSP) may be implemented in such systems for processing the received signals to provide demodulated data. Digital signal processing of the received signal provides speed and flexibility, and may be used to perform a variety of functions including correction of nonlinearities associated with the optical transmission path such as chromatic dispersion, polarization mode dispersion, etc.

Coherent detection schemes for phase modulated systems may use absolute phase detection. Absolute phase detection may involve making a decision, e.g. a soft decision, regarding the value of each bit in the received data stream based on an estimated phase. Unfortunately, for $M^2$-QAM, e.g., QPSK and 16 QAM, the signal constellation is invariant under a phase rotation of angle $\pi/2$. The carrier phase estimator used to determine the estimated phase cannot distinguish between an angle $\theta$ and an angle $\theta+\pi/2$. As a result, the estimated carrier phase may be pushed away from the current stable operating point into the domain of attraction of a neighboring stable operating point, which effectively rotates the signal constellation by $\pi/2$. This phenomenon is referred to as cycle slip. The cycle slip can generate a large number of decision errors after the cycle slip event. The effect of cycle slip can be limited to the duration of actual slip by using differential decoding of the information symbols. However, the differential decoding can have about twice the bit error rate of the absolute phase detection.

One approach for correcting cycle slip is to introduce pilot symbols with known information symbols. The pilot symbols remove the phase ambiguity since the carrier phase of the pilot symbol can be unambiguously estimated by calculating the difference of the phase between the received pilot symbol and the known information symbols. However, the overhead of the pilot symbol causes a larger symbol rate resulting in a sensitivity penalty. To address this, pilot symbols may be inserted with a large period. In general, it may take about half the number of symbols between pilot symbols period before the cycle slip is detected and the carrier phase reference is corrected. The time it takes to make the correction can result in burst errors in the detected data.

BRIEF DESCRIPTION OF THE DRAWINGS

Reference should be made to the following detailed description which should be read in conjunction with the following figures, wherein like numerals represent like parts.

DETAILED DESCRIPTION

In general, a system consistent with the present disclosure inserts three parity bits for each block of n−3 bits of data to be transmitted to produce blocks of n bits (n−3 information bits plus three parity bits associated with the n information bits). Each of the blocks of n bits are Gray mapped to three associated QAM symbols that are modulated onto an optical carrier and transmitted to a receiver. The receiver detects the symbols using a maximum a posteriori (MAP) and corrects for cycle slip. A system consistent with the present disclosure may be described as using cascaded single parity checking (CSPC) coding.

In one embodiment, for example the symbols associated with each block of n bits may be decoded by selecting the symbols having correct parity and the minimum Euclidean distance to the detected symbols. Since the detector uses correct parity in making symbol decisions an error signal in the detector increases with cycle slip to automatically detect and correct cycle slip and prevent the detector from converging on a 90 degree ($\pi/2$) phase error.

As used herein a "Gray map" or "Gray mapping" refers to the known Gray mapping scheme whereby a code is assigned to each of a contiguous set of bits such that adjacent code words differ by one bit and does not involve adding additional bits to a data stream (i.e. Gray mapping has no overhead). The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Figure 1:
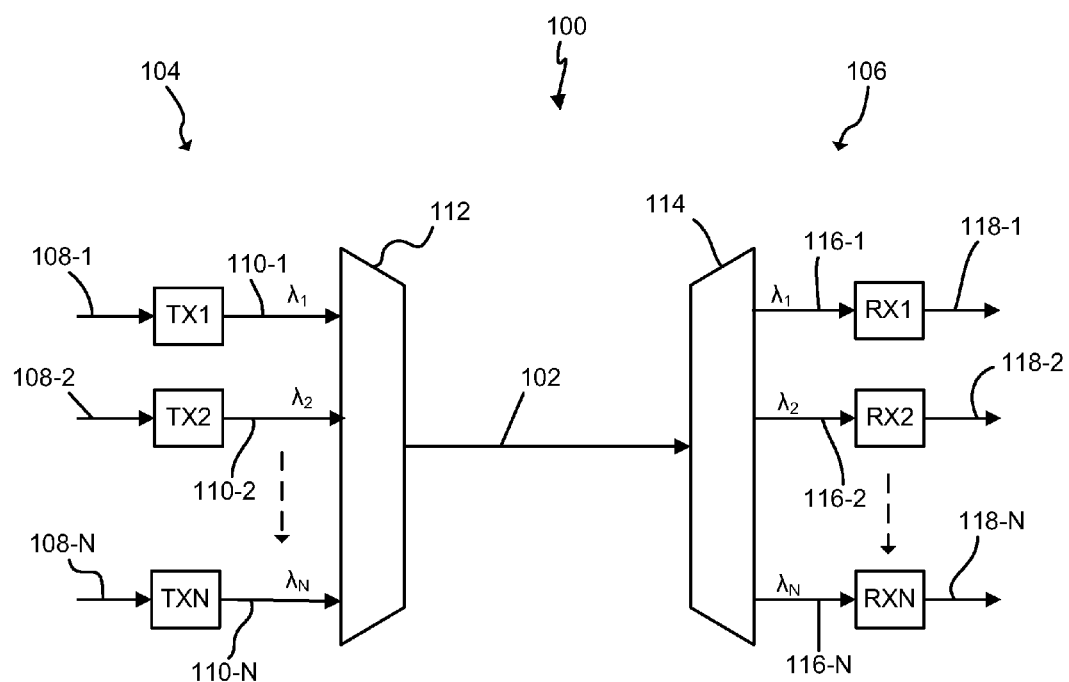
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1, \lambda_2 \ldots \lambda_N$. One or more of the transmitters TX1, TX2 . . . TXN may be configured to modulate data on the associated wavelength with using a modified BICM-ID scheme consistent with the present disclosure. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal using iterative decoding associated with a modified BICM-ID scheme consistent with the present disclosure and may provide an associated output data signal on an associated output path 118-1, 118-2, 118-3, 118-N.

Figure 2:
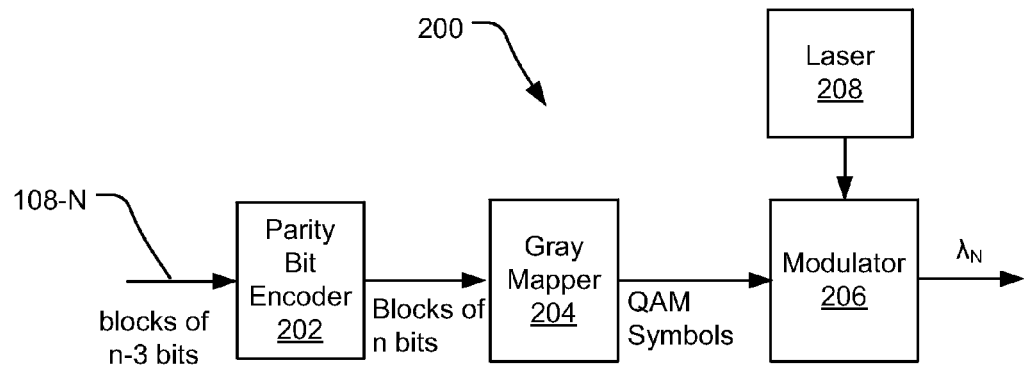
FIG. 2 is a block diagram of one exemplary embodiment of a transmitter consistent with the present disclosure.

FIG. 2 is a simplified block diagram of one exemplary transmitter 200 consistent with the present disclosure. The illustrated exemplary embodiment 200 includes a parity bit encoder 202, a Gray mapper 204, and a modulator 206 for modulating the output of a continuous-wave laser 208 for providing a coded and modulated output on a carrier wavelength $\lambda_N$.

The parity bit encoder 202 may be configured to encode each block of n−3 information bits of a data stream provided on input path 118-N with three associated parity bits. The output of the parity bit encoder 202 includes successive blocks of n bits, i.e. n−3 information bits plus three parity bits. In a manner that will be discussed in greater detail below, each of the parity bits added by the parity bit encoder 202 identifies the parity of different associated portions of the n bits.

As is known, a parity bit may be an even parity bit or an odd parity bit. When using even parity, the parity bit is set to a value of one if the number of ones in the information bits (not including the parity bit) associated with the parity bit is odd. If the number of ones in the information bits associated with the parity bit is already even, the even parity bit is set to a 0. When using odd parity, the parity bit is set to 1 if the number of ones in the information bits (not including the parity bit) associated with the parity bit is even. When the number of ones in the in the information bits associated with the parity bit is already odd, the odd parity bit is set to 0. Hardware and software configurations for encoding bits of input data with an even or odd parity bit in the parity bit encoder 202 are known to those of ordinary skill in the art.

The encoded output of the parity bit encoder is coupled to the Gray mapper 204. The Gray mapper 204 is configured map each block of n bits three associated QAM symbols. The three QAM symbols associated with each block of n bits are modulated onto an optical carrier wavelength $\lambda_N$ of the continuous-wave laser 208 using the modulator 206. The modulator 206 may modulate the plurality of QAM symbols onto the carrier wavelength $\lambda_N$ using any known modulation method. The encoded, mapped and modulated output of the modulator 206 may be coupled to the multiplexer 112 (FIG. 1) in a WDM system.

Figure 3:
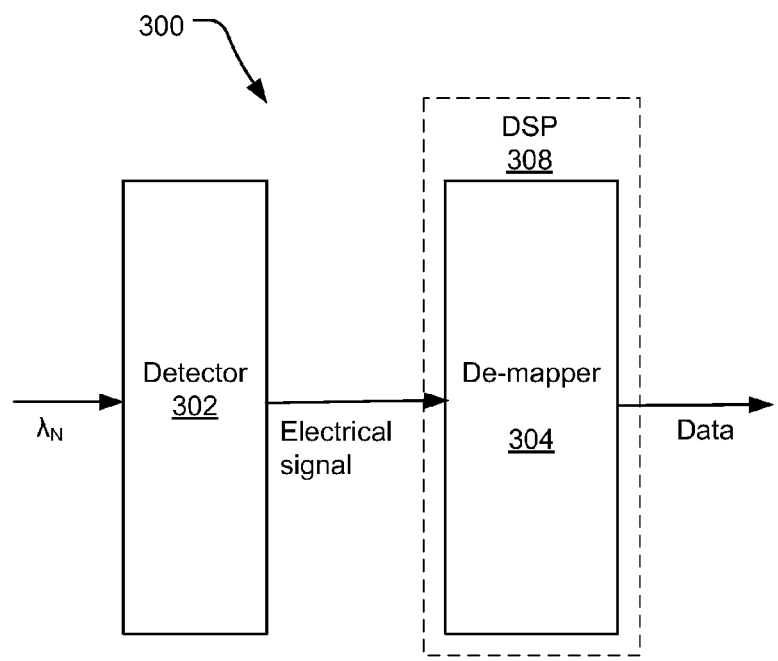
FIG. 3 is a block diagram of one exemplary embodiment of a receiver consistent with the present disclosure.

FIG. 3 is a simplified block diagram of one exemplary receiver 300 consistent with the present disclosure. The illustrated exemplary embodiment 300 includes an optical signal detector 302 and a de-mapper 304. The detector 302 may include a known coherent receiver, e.g. a polarization diversity coherent receiver, configured to receive the signal on the optical carrier wavelength $\lambda_N$ and convert the optical signal into one or more associated electrical outputs (e.g. an output associated with each polarization in a polarization multiplexed modulation format) representative of the QAM symbols modulated on the optical carrier wavelength $\lambda_N$ by the modulator 206 (FIG. 2).

The de-mapper 304 may be configured as a portion of a digital signal processing (DSP) circuit 308. In general, DSP involves processing of signals using one or more application specific integrated circuits (ASICS) and/or special purpose processors configured for performing specific instruction sequences, e.g. directly and/or under the control of software instructions. One example of a receiver incorporating a detector, i.e. a coherent receiver, and a DSP circuit using carrier phase estimation for processing the digital outputs of the coherent receiver is described in U.S. Pat. No. 8,295,713, the teachings of which are hereby incorporated herein by reference.

With reference to both FIGS. 2 and 3, the DSP circuit 308 may process the output of the detector 302 and provide an output that reproduces data provided at the input 108-N to the transmitter 200. The de-mapper 304 receives the electrical output of the detector 302 and uses a carrier phase estimation function to reverse the mapping applied by the Gray mapper 204 and remove the parity bits applied by the parity bit encoder 202. The output of the de-mapper is a de-mapped output representative of the successive blocks of n–3 bits of data provided at the input 108-N to the transmitter 200.

De-mapping may be performed, for example using a maximum a posteriori (MAP) detector, and may be performed iteratively in response to a priori log likelihood ratio (LLR) feedback from the output of the receiver. The de-mapper 304 in a system consistent with the present disclosure may cause correction of cycle slip using parity indicated by the parity bits applied by the parity bit encoder 202. In some embodiments, for example, the de-mapper 304 may use the parity bits to perform de-mapping in a manner that automatically causes correction of cycle slip.

For any given $M^2$-QAM where M is a positive integer, each symbol is represented by $\log_2(M^2)$ bits. A CSPC scheme consistent with the present disclosure uses three QAM symbols at time. For example, for 16-QAM the total number of bits for every three-symbol CSPC block is $3 \times \log_2(16)=12$. The three-symbol CSPC block code has a code rate of n–3/n, where $n=3 \times \log_2(M^2)$ is the number of code bits.

Figure 4:
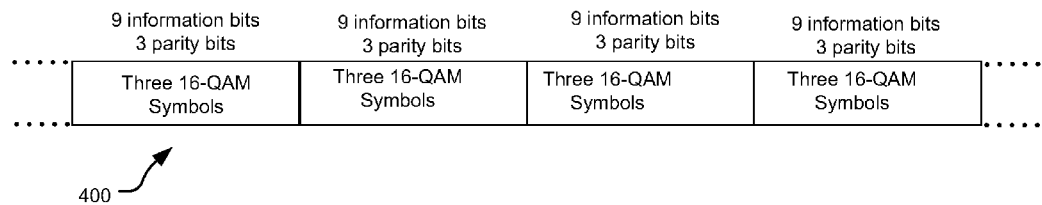
FIG. 4 diagrammatically illustrates a modulated output of an exemplary transmitter consistent with the present disclosure.
Figure 5:
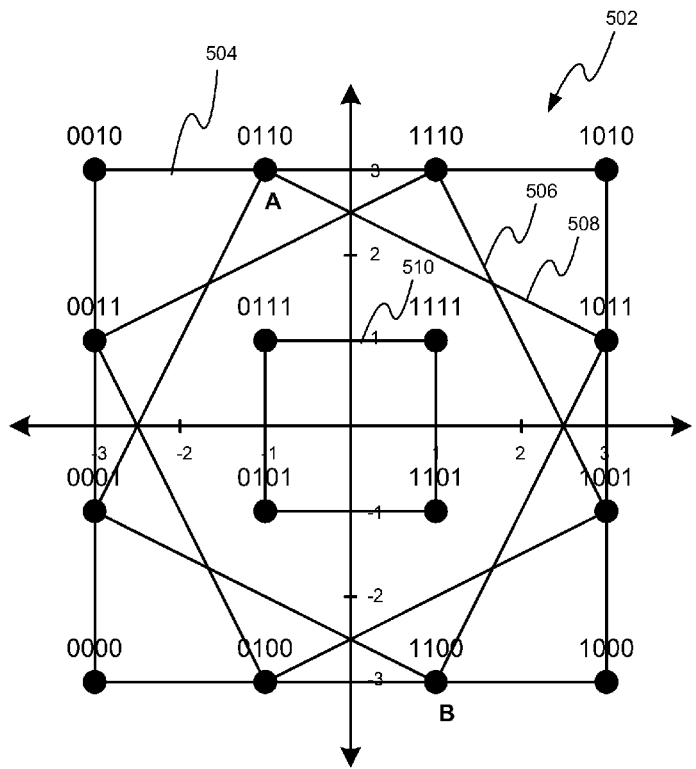
FIG. 5 is a constellation diagram of one exemplary embodiment of a 16-QAM signal with constellation points interconnected to illustrate symbols associated with 90 degree phase errors in a system consistent with the present disclosure.

For example, FIG. 4 diagrammatically illustrates a 12-bit CSPC 16-QAM (also referred to herein as CSPC(9,12)) output 400 consistent with the present disclosure wherein the parity bit encoder 202 adds three parity bits to each consecutive nine information bits to provide blocks of twelve bits to the Gray mapper 204. The Gray mapper 204 maps the consecutive blocks of twelve bits to three associated symbols. FIG. 5 is a constellation diagram 502 illustrating Gray mapping of a 16-QAM signal by the Gray mapper 204. In a known manner, the constellation diagram of FIG. 5 illustrates a plurality of constellation points indicating the amplitude and phase of each QAM symbol, along with the bits (code word) associated with the symbol. For simplicity and ease of explanation, exemplary embodiments described herein may use CSPC(9,12). Those of skill in the art will recognize, however, that a system consistent with the present disclosure may be generalized for any $M^2$-QAM constellation.

The parity bits $P_1$, $P_2$, and $P_3$ inserted into the data stream by the parity bit encoder 202 each indicate parity of an associated set of the n bits (the information bits $x_1, x_2, \ldots x_{n-3}$, and the parity bits $P_1$, $P_2$, and $P_3$) in the CSPC block provided to the Gray mapper 204. In particular:

1. The parity bit $P_1$ is calculated as:

$$P_1 = \overline{XOR(x_1, x_2, \ldots, x_{2n/3-1})} \qquad \text{(equation 1)}$$

so that the parity of a total of 2n/3 bits is odd.

2. The parity bit $P_2$ is calculated as:

$$P_2 = XOR(x_{i+j}), \forall i,j \text{ where } j \in (0, n/3, 2n/3), \text{ and}$$

$$i \in \begin{cases} \left\{1, \ldots \dfrac{n}{6}\right\} \text{ for } j \in \left\{0, \dfrac{n}{3}\right\} \\ \left\{1, \ldots \dfrac{n}{6} - 1\right\} \text{ for } j = \dfrac{2n}{3} \end{cases} \qquad \text{(equation 2)}$$

so that the parity of a total of n/2 bits is even.

3. The parity bit $P_3$ is calculated as:

$$P_3 = \overline{XOR(x_1, x_2, \ldots, x_{n-3}, P_1, P_2)} \qquad \text{(equation 3)}$$

so that the parity of all n bits is odd. Although the parity bits $P_1$, $P_2$, and $P_3$ are described as indicating a particular (odd or even) parity for their associated sets of bits, those of ordinary skill in the art will recognize that the parity bit encoder use the opposite parity (odd or even) for the parity bits $P_1$, $P_2$, and $P_3$.

The three parity bits $P_1$, $P_2$, and $P_3$, calculated as described in equations 1-3 above, are inserted by the parity bit encoder 202 into known locations within the CSPC block of n bits as follows:

1. $P_1$ is positioned anywhere in the first 2n/3 bits
2. $P_2$ is positioned anywhere between the $2n/3+1^{th}$ bit and the $5n/6^{th}$ bit.
3. $P_3$ is positioned anywhere between the $2n/3+1^{th}$ and the $n^{th}$ bits that is different from the position of $P_2$.

Placing the parity bits in these locations within the CSPC block of n bits establishes set partitioning in the QAM symbols associated with the CSPC block. Set partitioning using CSPC consistent with the present disclosure allows modulated symbols to be selected at the receiver from sets with increasing minimum Euclidean distance between constellation points. This allows for detection at low signal-to-noise ratio (SNR) or equivalently low Q-factors.

Figure 6A:
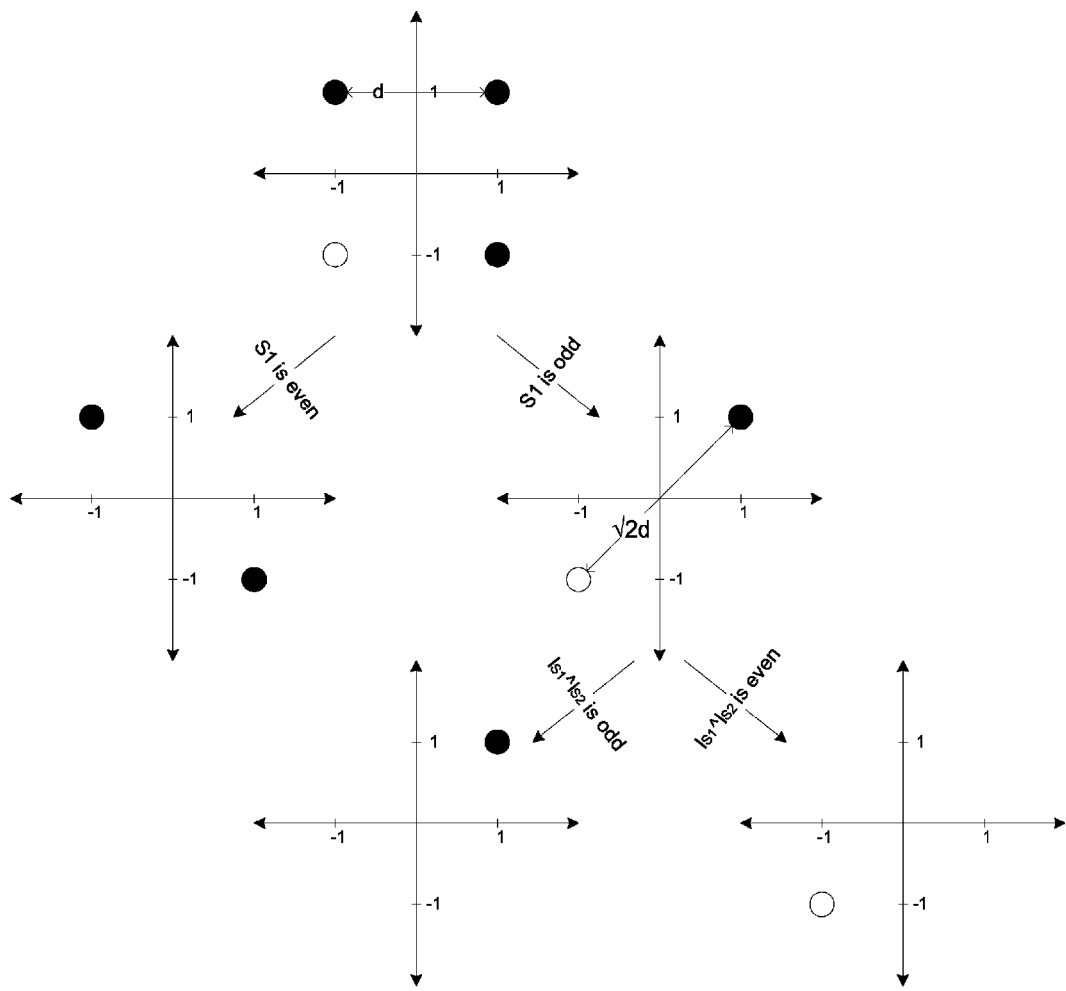
FIGS. 6A, 6B, and 6C include constellation diagrams diagrammatically illustrating set partitioning consistent with the present disclosure using QPSK, 16-QAM, and 64-QAM, respectively.
Figure 6B:
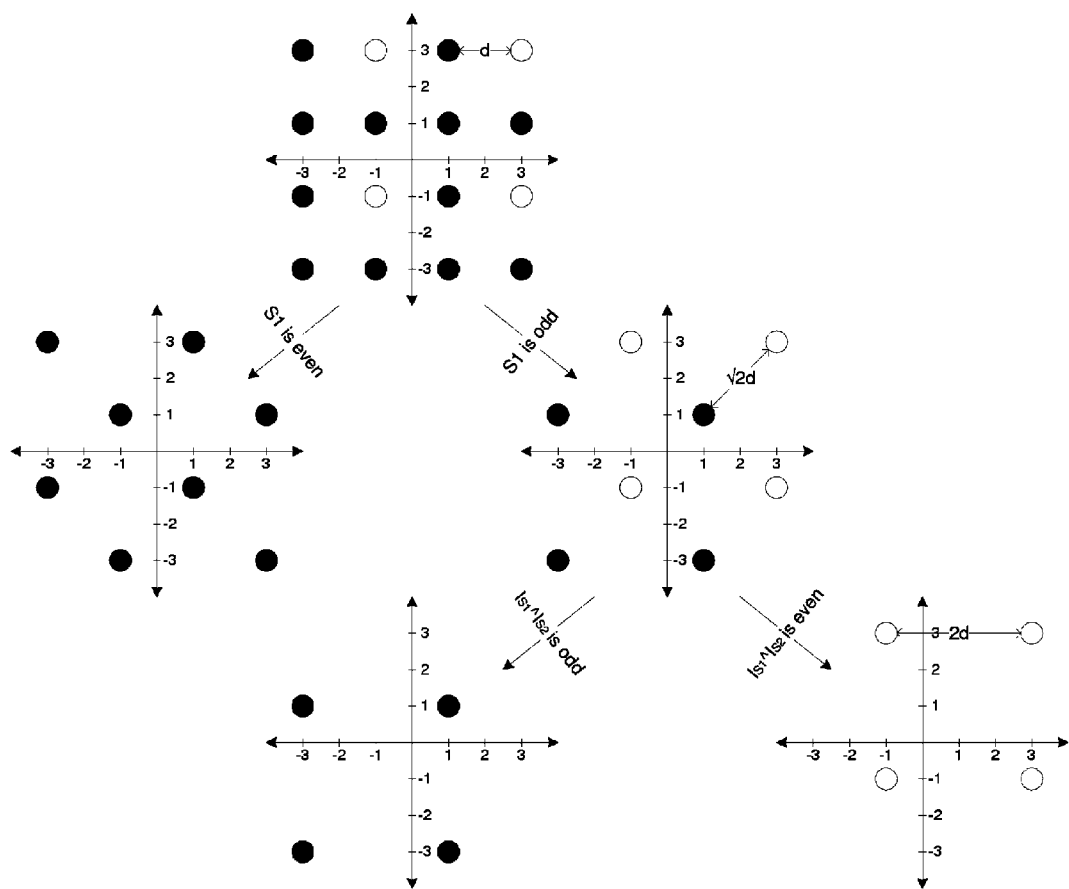
Figure 6C:
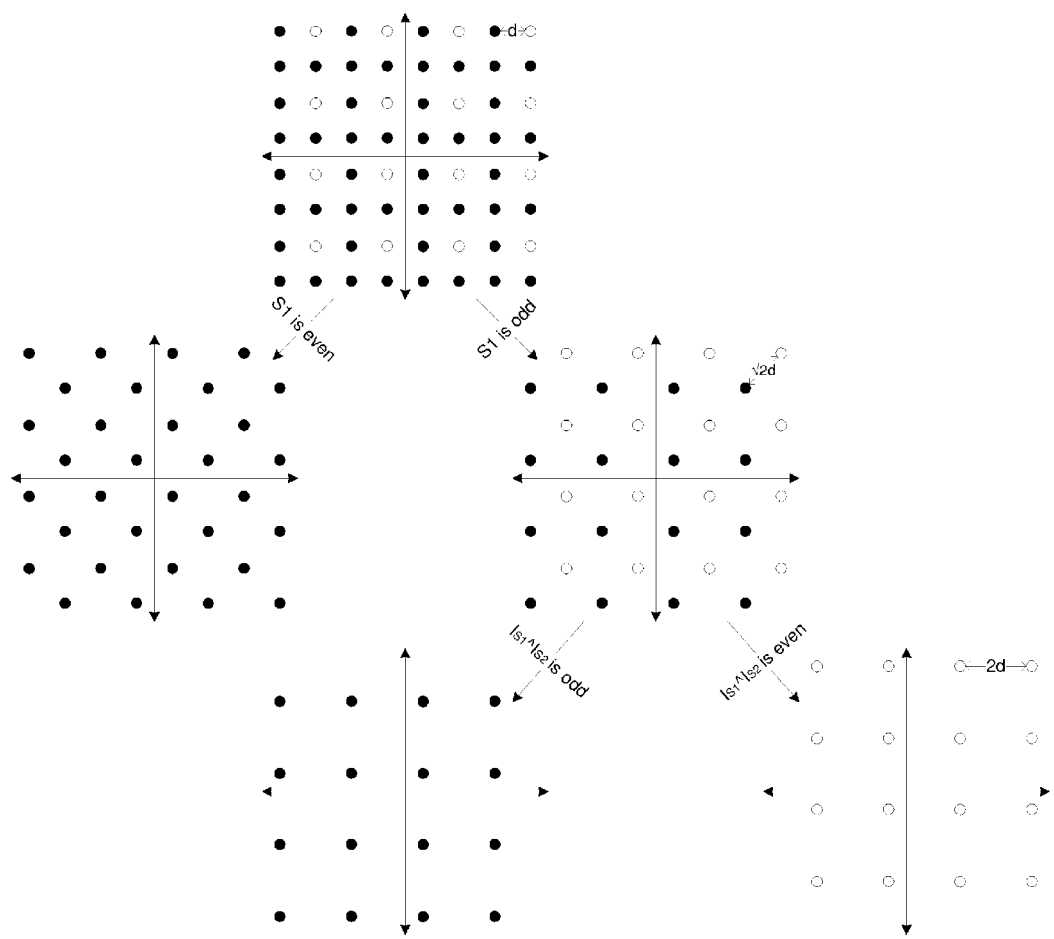

FIGS. 6A, 6B, and 6C, for example, illustrate set partitioning consistent with the present disclosure for CSPC used with QPSK, 16-QAM, and 64-QAM, respectively. The set partitioning process is common to the embodiments illustrated in FIGS. 6A-6C, and can be applied to any CSPC coded $M^2$-QAM consistent with the present disclosure. As shown, set partitioning in a CSPC coded $M^2$-QAM consistent with the present disclosure increases the Euclidean distance between constellation points in the second symbol to $\sqrt{2}d$, where d is the minimum Euclidean distance between the constellation points in the first symbol. The Euclidean distance between the points in the third symbol is increased to 2d.

With reference to FIG. 6A, 6B or 6C, for example, given the first symbol (S1) in a sequence, as a result of the CSPC consistent with the present disclosure the second symbol (S2) may be chosen from a subset that is determined by the Hamming weight of S1. Those of ordinary skill in the art recognize that the Hamming weight of a string of bits is the number "1s" in the string. For example, if the Hamming weight of S1 is even, then S2 is chosen from the subset illustrated on the left in FIGS. 6A-6C, if Hamming weight of S1 is odd, then S2 is chosen from the subset illustrated on the right in FIGS. 6A-6C.

The third symbol (S3) is determined by S1 and S2. S3 may be chosen from a subset that is determined by the Hamming weight of the $$\frac{\log_2(M^2)}{2}$$

most significant bits (MSB) of S1 and S2 (referred to as IS1^IS2). For example, if the Hamming weight of IS1^IS2 is even, then S3 is chosen from the subset illustrated on the right in FIGS. 6A-6C, if Hamming weight of IS1^IS2 is odd, then S3 is chosen from the subset illustrated on the left in FIGS. 6A-6C.

At the receiver 300, the de-mapper 304 may detect and correct for cycle slip by using the fact that in Gray mapped QAM the parity associated with the mapped bits changes after every 90 degree phase rotation. This characteristic is illustrated in FIG. 5 by the squares 504, 506, 508, 510 interconnecting the constellation points. The corner of each square is positioned on a constellation point that is 90 degrees from the constellation points on the adjacent corners. For any constellation point, the constellation points that are ±90 degrees therefrom have different parity. For example the 16-QAM symbol associated with bits (1 1 1 0) will change to the 16-QAM symbol associated with bits (0 0 1 1) or bits (1 0 0 1) after 90 degree phase rotation.

This rule is true for any $M^2$-QAM with Gray mapping, where M is the number of bits encoded by a symbol. In particular, for an $M^2$-QAM symbol $x+yi$ is generated by mapping $\log_2(M)$ binary bits into M-pulse amplitude modulation (PAM) in both the real and imaginary parts independently. With x and y as real numbers and Gray mapping, the PAM signal y has a property that, $\text{Parity}(y) \neq \text{Parity}(-y)$ This is because with Gray mapping the two nearest symbols with opposite sign have only one bit difference so that the parity of these two symbols is different. The parity of QAM symbols are $\text{Parity}(x+yi) = \text{Parity}(x) \text{ XOR Parity}(y)$ $\text{Parity}(x-yi) = \text{Parity}(x) \text{ XOR Parity}(-y)$ Therefore, $\text{Parity}(x+yi) \neq \text{Parity}(x-yi)$ On the other hand, exchanging real and imaginary part of the $M^2$-QAM symbol does not change the parity $\text{Parity}(x-yi) = \text{Parity}(-y+xi)$ Therefore, $\pi/2$ phase rotation of symbol $(x+yi)e^{j\pi/2} = -y+xi$ changes the parity.

$\text{Parity}(x+yi) \neq \text{Parity}(-y+xi)$

Since the parity of the bits associated with Gray mapped QAM symbols changes with every 90 degree phase rotation, any 90 degree phase rotation, i.e. cycle slip, can be detected and corrected by a MAP decoder at the receiver, since the probability of symbol sequence errors will increase drastically with 90 phase rotations.

For example, in an CSPC (9,12) embodiment consistent with the present disclosure, the de-mapper 304 may include multi-tap linear filters $h_x(k)$, $h_y(k)$, $k=-N, -N+1, \ldots, N$ used to equalize the linear distortion and carrier phase offset that are adaptively updated by the error signal e(m) from a MAP decoder as $e(m) = \text{MAP}(u(m-1), u(m), u(m+1)) - u(m)$ $h_x(k) = h_x(k) + \mu e(m) x^*(m-k)$ $h_y(k) = h_y(k) + \mu e(m) y^*(m-k)$ where μ is the step size of the adaptive filter. The MAP decoder may determine the set of three 16 QAM symbols with correct parity indicated by the parity bits $P_1$, $P_2$, and $P_3$ (there are total $2^{n-3}=512$ possible pairs with 9 information bits) that have the minimum Euclidean distance from the filtered signal u(n). In one embodiment, for example, the MAP decoder can be implemented efficiently by Wagner's algorithm which only requires n=10 Euclidean distance calculations.

Since the error signal e(m) is driven by the MAP decoder with correct parity, the error signal will be large at 90 degree (π/2) phase error. In other words, the solution of the adaptive equalizer for phase tracking in the de-mapper 304 can never converge to 90 degree phase error, thereby preventing cycle slip into the neighboring quadrant. Moreover, due to the increased Euclidean distance between symbol sequences resulting from CSPC consistent with the present disclosure, the output of the MAP decoder has an improved confidence and a high correction capability even at low Q-factor. This enables equalization while avoiding 90 degree phase ambiguity, even at Q-factor values of as low as 3.5 dB where the probability of symbol error is larger than 25%. In addition, error free transmission can thus be achieved at low SNR, a higher net coding gain (NCG), e.g. 12.8 dB, can be achieved given the same FEC code, and moderate spectral efficiencies can be achieved to accommodate flexi-rate transponder technology.

Figure 7:
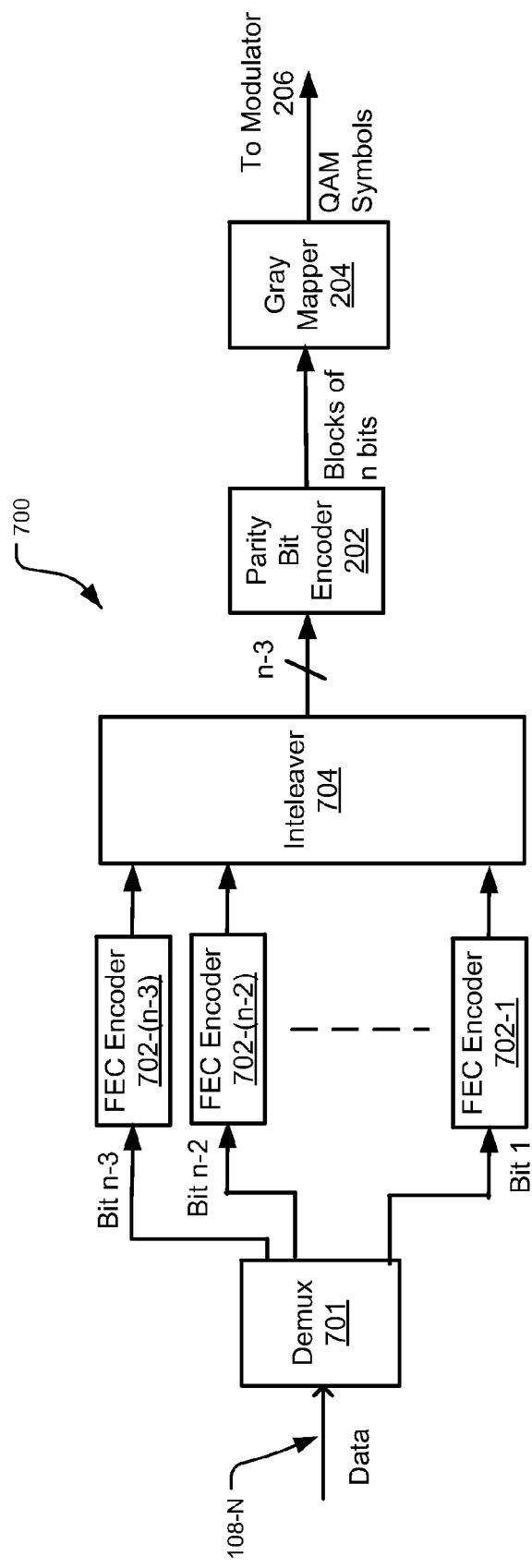
FIG. 7 is a block diagram of another exemplary embodiment of a transmitter consistent with the present disclosure.

A CSPC coded system consistent with the present disclosure may be implemented in a variety of configurations. FIG. 7 is a simplified block diagram of an exemplary transmitter 700 consistent with the present disclosure configured implementing CSPC coding in a bit-interleaved coded modulation (BICM) configuration. The illustrated exemplary embodiment 700 includes a demultiplexer 701, a plurality of FEC encoders 702-(n−3), 702-(n−2) . . . 702-1, an interleaver 704, a parity bit encoder 202, and a Gray mapper 204 for driving a modulator 206 as described in connection with FIG. 2.

The demultiplexer 701 may take a known configuration for receiving a serial input data stream on path 108-N and demultiplexing the input data stream into n−3 separate parallel demultiplexed data streams. Each of the n−3 data streams are coupled to an associated one of the FEC encoders 702-(n−3), 702-(n−2) . . . 702-1. The FEC encoders 702-(n−3), 702-(n−2) . . . 702-1 may each be configured to encode the data stream received thereby with an associated FEC code to provide an associated FEC encoded output.

Numerous FEC codes are known, each with different properties related to how the codes are generated and consequently how they perform. Examples of known error correcting codes include the linear and cyclic Hamming codes, the cyclic Bose-Chaudhuri-Hocquenghem (BCH) codes, the convolutional (Viterbi) codes, the cyclic Golay and Fire codes, Turbo convolutional and product codes (TCC, TPC), and low density parity check codes (LDPC). A LDPC code is a particularly useful code for the FEC encoders 702-(n−3), 702-(n−2) . . . 702-1 due to its low associated overhead.

Hardware and software configurations for implementing various error correcting codes in the FEC encoders 702-(n–3), 702-(n–2) . . . 702-1 and corresponding decoders 802-(n–3), 802-(n–2) . . . 802-1 (FIG. 8) are known to those of ordinary skill in the art.

The encoded output of each of the FEC encoders 702-(n–3), 702-(n–2) . . . 702-1 is coupled to the interleaver 704. A variety of interleaver configurations are known. In the illustrated embodiment, the interleaver 704 receives n–3 output code words from the FEC encoders 702-(n–3), 702-(n–2) . . . 702-1 and provides a parallel interleaved output of n–3 bits to the parity bit encoder 202.

As described above, the parity bit encoder 202 may be configured to encode each block of n–3 bits with three associated parity bits. The output of the parity bit encoder 202 includes successive blocks of n bits, i.e. n–3 information bits plus three parity bits. The encoded output of the parity bit encoder 202 is coupled to the Gray mapper 204. The Gray mapper 204 is configured map each block of n bits to three associated QAM symbols. The QAM symbols associated with each block of n bits are provided to the modulator 206 for modulating the symbols onto an optical carrier wavelength $\lambda_N$ of a continuous-wave laser 208.

Figure 8:
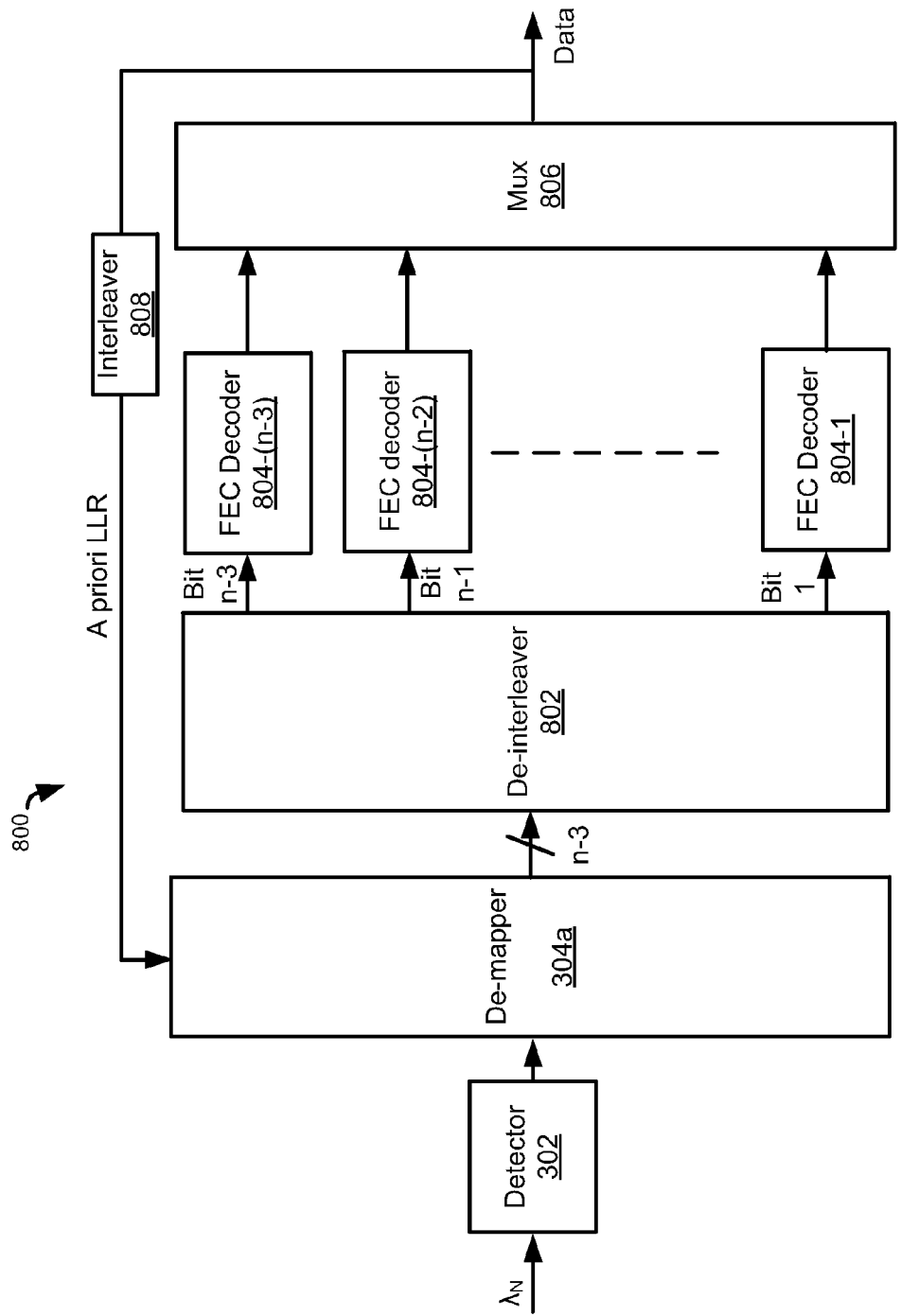
FIG. 8 is a block diagram of another exemplary embodiment of a receiver consistent with the present disclosure.

FIG. 8 is a simplified block diagram of one exemplary receiver 800 consistent with the present disclosure for receiving a signal modulated using the transmitter 700 shown in FIG. 7. The illustrated exemplary embodiment 800 includes a detector 302, a de-mapper 304a, a de-interleaver 802, a plurality of FEC decoders 804-(n–3), 804-(n–2) . . . 804-1, a multiplexer 806, and an interleaver 808.

As described above, the detector 302 is configured to receive the optical signal modulated on the carrier wavelength $\lambda_N$ and to convert the optical signal into an electrical signal. The de-mapper 304a receives the output of the detector 302 and reverses the mapping of data to the modulation format imparted by the Gray mapper 204 at the transmitter and removes the parity bits applied by the parity bit encoder, e.g. using a MAP decoder as described above. As shown, de-mapping may be performed iteratively in response to a priori LLR feedback from the output of the receiver, i.e. the output of the multiplexer 806 in the illustrated embodiment. The de-mapper 304a provides a de-mapper output including blocks of n–3 bits, reproducing the output of the interleaver 704 in the transmitter 700.

The de-mapper output of the de-mapper 304a is coupled to the de-interleaver 802 which reverses the bit-interleaving performed by the associated interleaver 704 in the transmitter 700 and provides n–3 associated de-interleaved outputs to the FEC decoders 804-(n–3), 804-(n–2) . . . 804-1. The FEC decoders 804-(n–3), 804-(n–2) . . . 804-1 may each be configured to decode the data stream received thereby using the FEC code applied at the transmitter 700 to provide associated FEC decoded outputs. The n–3 FEC decoded outputs of each of the FEC decoders 804-(n–3), 804-(n–2) . . . 804-1 are coupled to a known multiplexer 806. The multiplexer 806 multiplexes outputs of the FEC code decoders 804-(n–3), 804-(n–2) . . . 804-1 to produce a serial digital data output that reproduces the data on path 118-N at the transmitter 700.

The data output of the multiplexer 806 is fed back to the de-mapper 304a through the interleaver 808 to provide a priori LLR information used by the de-mapper 304a in decoding the input thereto. The interleaver 808 essentially reverses the de-interleaving performed by the de-interleaver 802.

Figure 9:
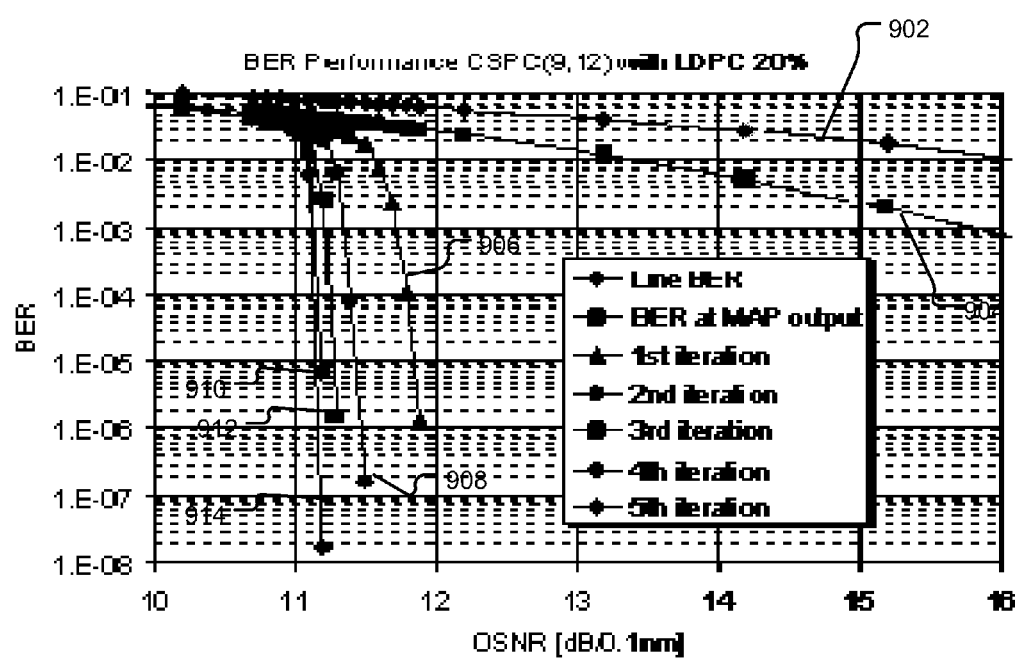
FIG. 9 is a plot of BER vs. SNR illustrating performance of an exemplary scheme consistent with the present disclosure using bit-interleaved coded modulation and iterative decoding.

Performance of the above-described CSPC (9,12)-BICM with iterative decoding (ID) embodiment using a 20% LDPC code as the first FEC code, resulting in a 4.8 b/s/Hz SE, is illustrated in connection with FIG. 9. FIG. 9 includes a measured plot 702 of the line bit error rate (BER) and a plot 704 of the BER at the MAP detector output, along with plots 706, 708, 710, 712 and 714 of the bit error rate (BER) at the output of the receiver vs. SNR/bit (dB) at the input to the receiver. Each plot 706, 708, 710, 712 and 714 is associated with a different iteration of the decoding at the receiver. The illustrated plots show that a modified CSPC-BICM-ID scheme consistent with the present disclosure enables equalization with progressively low SNR with iteration.

Figure 10:
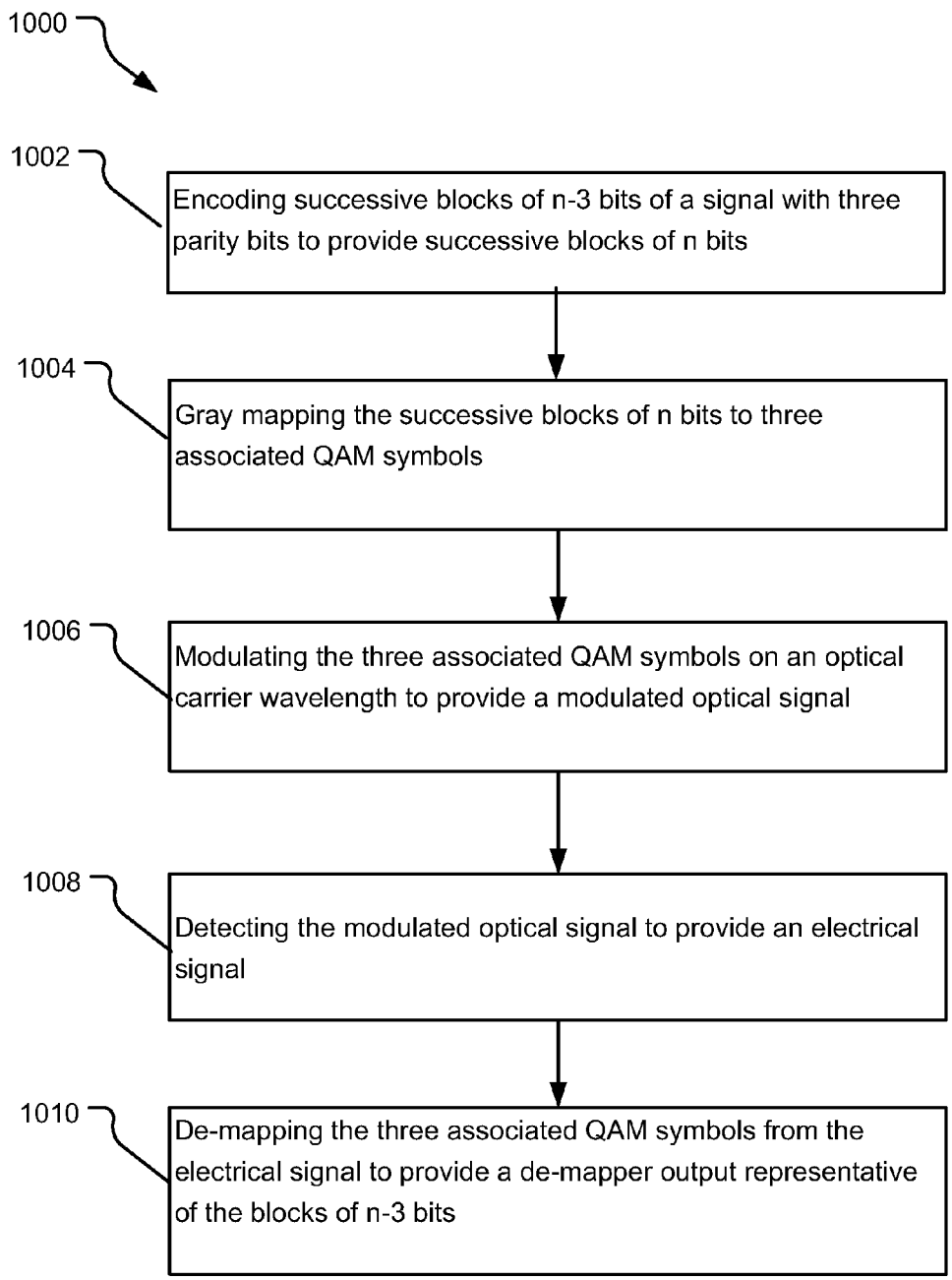
FIG. 10 is flow chart illustrating one example of a method consistent with the present disclosure.

FIG. 10 is a flow chart illustrating a method 1000 consistent with the present disclosure. Operation 1002 includes encoding successive blocks of n–3 bits of a signal with three parity bits to provide successive blocks of n bits. The successive blocks of n bits are Gray mapped 1004 to three associated QAM symbols which are modulated 1006 on an optical carrier wavelength to provide a modulated optical signal. The modulated optical signal is detected 1008 to provide an electrical signal, and the three associated QAM symbols are de-mapped 1010 from the electrical signal to provide a de-mapper output representative of the blocks of n–3 bits.

While FIG. 10 illustrates various operations according to an embodiment, it is to be understood that not all of the operations depicted in FIG. 10 are necessary for other embodiments. Indeed, it is fully contemplated herein that in other embodiments of the present disclosure, the operations depicted in FIG. 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect of the disclosure there is provided a system including: a parity bit encoder configured to encode successive blocks of n–3 bits with three parity bits to provide successive blocks of n bits; a Gray mapper coupled to the parity bit encoder and configured to map each one of the blocks of n bits to three associated quadrature amplitude modulated (QAM) symbols; a modulator coupled to the Gray mapper and configured to modulate an optical signal in response to an output of the Gray mapper to provide a modulated optical signal including the three associated QAM symbols; a detector for receiving the modulated optical signal and providing an electrical signal representative of the optical signal; and a de-mapper configured to provide a de-mapper output representative of the blocks of n–3 bits in response to the electrical signal.

According to another aspect of the disclosure, there is provided an optical signal receiver including: a detector for receiving a modulated optical signal representing blocks of n bits including n–3 information bits and three parity bits mapped to three associated quadrature amplitude modulated (QAM) signals and for providing an electrical signal representative of the optical signal; and a de-mapper configured to provide a de-mapper output representative of the n–3 information bits in response to the electrical signal.

According to another aspect of the disclosure there is provided a method including: encoding successive blocks of n–3 bits of a signal with three parity bits to provide successive blocks of n bits; Gray mapping the successive blocks of n bits to three associated quadrature amplitude modulated (QAM) symbols; modulating the three associated QAM symbols on an optical carrier wavelength to provide a modulated optical signal; detecting the modulated optical signal to provide an electrical signal; and de-mapping the three associated QAM symbols from the electrical signal to provide a de-mapper output representative of the blocks of n–3 bits.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitter and/or receiver may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system comprising:
a parity bit encoder configured to encode successive blocks of n−3 bits with three parity bits to provide successive blocks of n bits;
a Gray mapper coupled to said parity bit encoder and configured to map each one of said blocks of n bits to three associated quadrature amplitude modulated (QAM) symbols;
a modulator coupled to said Gray mapper and configured to modulate an optical signal in response to an output of said Gray mapper to provide a modulated optical signal comprising said three associated QAM symbols;
a detector for receiving said modulated optical signal and providing an electrical signal representative of said optical signal; and
a de-mapper configured to provide a de-mapper output representative of said blocks of n−3 bits in response to said electrical signal.

2. A system according to claim 1, wherein said three parity bits are calculated according to the following equations:

$$P_1 = \overline{XOR(x_1, x_2, \ldots, x_{\frac{2n}{3}-1})};$$

$$P_2 = \overline{XOR(x_{i+j})}, \forall\, i, j$$

where $j \in \left(0, \frac{n}{3}, \frac{2n}{3}\right)$, $$i \in \begin{cases} \left\{1, \ldots \frac{n}{6}\right\} \text{ for } j \in \left\{0, \frac{n}{3}\right\} \\ \left\{1, \ldots \frac{n}{6} - 1\right\} \text{ for } j = \frac{2n}{3} \end{cases}; \text{ and}$$

$$P_3 = \overline{XOR(x_1, x_2, \ldots, x_{n-3}, P_1, P_2)},$$

where $P_1$, $P_2$, and $P_3$, are first, second and third ones of said three parity bits, respectively, and $x_1, x_2, \ldots x_{n-3}$, are the n−3 bits, respectively.

3. A system according to claim 2, wherein said parity bit encoder is configured to position said three parity bits within said n bits according to the following:
$P_1$ is positioned anywhere in the first 2n/3 bits;
$P_2$ is positioned anywhere between the 2n/3+1$^{th}$ bit and the 5n/6$^{th}$ bit; and
$P_3$ is positioned anywhere between the 2n/3+1$^{th}$ and the n$^{th}$ bits that is different from the position of $P_2$.

4. A system according to claim 1, wherein said de-mapper is configured to provide said de-mapper output by selecting a second one of said three associated QAM symbols based on a Hamming weight of a first one of said three associated QAM symbols.

5. A system according to claim 4, wherein said de-mapper is configured to provide said de-mapper output by selecting a third one of said three associated QAM symbols based a Hamming weight of the $$\frac{\log_2(M^2)}{2}$$

most significant bits of said first and second ones of said three associated QAM symbols, where M is a number of bits represented by each symbol of said three associated QAM symbols.

6. A system according to claim 1, said de-mapper being further configured to cause correction of cycle slip using parity indicated by said three parity bits.

7. A system according to claim 1, said system further comprising
a demultiplexer configured to receive a serial input data stream and demultiplex said serial input data stream into a plurality of demultipexed data streams;
a plurality of forward error correction (FEC) encoders, each of said FEC encoders being configured to encode an associated one of said demultiplexed data streams using a FEC code and provide an associated FEC encoded output; and
an interleaver coupled said plurality of FEC encoders and configured to provide an interleaved output comprising said successive blocks of n−3 bits to said parity bit encoder.

8. A system according to claim 1, said system further comprising
a de-interleaver coupled to said de-mapper and configured to provide a plurality of de-interleaved outputs in response to said de-mapper output; and
a plurality of FEC decoders, each of said FEC decoders being configured to receive an associated one of said de-interleaved outputs and provide an associated FEC decoded output signal.

9. An optical signal receiver comprising:
a detector for receiving a modulated optical signal representing blocks of n bits comprising n−3 information bits and three parity bits mapped to three associated quadrature amplitude modulated (QAM) signals and for providing an electrical signal representative of said optical signal; and
a de-mapper configured to provide a de-mapper output representative of said n−3 information bits in response to said electrical signal.

10. An optical signal receiver according to claim 9, wherein said de-mapper is configured to provide said de-mapper output by selecting a second one of said three associated QAM symbols based on a Hamming weight of a first one of said three associated QAM symbols.

11. An optical signal receiver according to claim 10, wherein said de-mapper is configured to provide said de-mapper output by selecting a third one of said three associated QAM symbols based a Hamming weight of the $$\frac{\log_2(M^2)}{2}$$

most significant bits of said first and second ones of said three associated QAM symbols, where M is a number of bits represented by each symbol of said three associated QAM symbols.

12. An optical signal receiver according to claim 9, said de-mapper being further configured to cause correction of cycle slip using parity indicated by said three parity bits.

13. An optical signal receiver according to claim 9, said system further comprising
a de-interleaver coupled to said de-mapper and configured to provide a plurality of de-interleaved outputs in response to said de-mapper output; and a plurality of FEC decoders, each of said FEC decoders being configured to receive an associated one of said de-interleaved outputs and provide an associated FEC decoded output signal.

14. A method comprising:
encoding successive blocks of n−3 bits of a signal with three parity bits to provide successive blocks of n bits;
Gray mapping said successive blocks of n bits to three associated quadrature amplitude modulated (QAM) symbols;
modulating said three associated QAM symbols on an optical carrier wavelength to provide a modulated optical signal;
detecting said modulated optical signal to provide an electrical signal; and
de-mapping said three associated QAM symbols from said electrical signal to provide a de-mapper output representative of said blocks of n−3 bits.

15. A method according to claim 14, wherein said encoding comprises calculating said three parity according to the following equations:

$$P_1 = \overline{XOR(x_1, x_2, \ldots, x_{\frac{2n}{3}-1})};$$

$$P_2 = XOR(x_{i+j}), \forall\, i,\, j$$

where $j \in \left(0, \dfrac{n}{3}, \dfrac{2n}{3}\right)$, $$i \in \begin{cases} \left\{1, \ldots \dfrac{n}{6}\right\} \text{ for } j \in \left\{0, \dfrac{n}{3}\right\} \\ \left\{1, \ldots \dfrac{n}{6}-1\right\} \text{ for } j = \dfrac{2n}{3} \end{cases}; \text{ and}$$

$$P_3 = \overline{XOR(x_1, x_2, \ldots, x_{n-3}, P_1, P_2)},$$

where $P_1$, $P_2$, and $P_3$, are first, second and third ones of said three parity bits, respectively, and $x_1, x_2, \ldots x_n$−3, are the n−3 bits, respectively.

16. A method according to claim 15, wherein said encoding comprises positioning said three parity bits within said n bits according to the following:
$P_1$ is positioned anywhere in the first 2n/3 bits.
$P_2$ is positioned anywhere between the 2n/3+1$^{th}$ bit and the 5n/6$^{th}$ bit; and
$P_3$ is positioned anywhere between the 2n/3+1$^{th}$ and the n$^{th}$ bits that is different from the position of $P_2$.

17. A method according to claim 14, wherein said de-mapping comprises selecting a second one of said three associated QAM symbols based on a Hamming weight of a first one of said three associated QAM symbols.

18. A method according to claim 17, wherein said de-mapping comprises selecting a third one of said three associated QAM symbols based a Hamming weight of the $$\frac{\log_2(M^2)}{2}$$

most significant bits of said first and second ones of said three associated QAM symbols, where M is a number of bits represented by each symbol of said three associated QAM symbols.

19. A method according to claim 14, wherein said de-mapping comprises correcting cycle slip using parity indicated by said three parity bits.

20. A method according to claim 14, said method further comprising
  demultiplexing an input signal to provide a plurality of demultiplexed data streams;
  encoding each of said plurality of demultiplexed data streams using an forward error correction (FEC) code to provide a plurality of FEC encoded outputs; and
  interleaving said FEC encoded outputs to provide said successive blocks of n−3 bits.

\* \* \* \* \*